(12) United States Patent
Wagner (10) Patent No.: US 10,244,746 B1
(45) Date of Patent: Apr. 2, 2019

(54) ARM REST FOR A FISHING POLE

(71) Applicant: Steve V. Wagner, Riverside, CA (US)

(72) Inventor: Steve V. Wagner, Riverside, CA (US)

( * ) Notice: Subject to any disclaimer, the term of this patent is extended or adjusted under 35 U.S.C. 154(b) by 0 days.

(21) Appl. No.: 16/215,494

(22) Filed: Dec. 10, 2018

Related U.S. Application Data (60) Provisional application No. 62/647,348, filed on Mar. 23, 2018, provisional application No. 62/703,294, filed on Jul. 31, 2018.

(51) Int. Cl.
*A01K 87/00* (2006.01)
*A01K 97/10* (2006.01)
*A01K 87/02* (2006.01)
*A01K 89/015* (2006.01)

(52) U.S. Cl.
CPC .............. *A01K 97/10* (2013.01); *A01K 87/00* (2013.01); *A01K 87/02* (2013.01); *A01K 89/01925* (2015.05)

(58) Field of Classification Search
CPC ... A01K 87/00; A01K 97/10; A01K 89/01925
USPC .......................................................... 43/21.2
See application file for complete search history.

(56) References Cited

U.S. PATENT DOCUMENTS

| | | | | |
|---|---|---|---|---|
| 2,158,104 A | * | 5/1939 | Bowen | A01K 87/08 43/25 |
| 2,244,408 A | * | 6/1941 | Thompson | A01K 87/08 224/922 |
| 3,367,056 A | * | 2/1968 | Johnson | A01K 87/08 224/922 |
| 4,190,977 A | * | 3/1980 | Casper | A01K 87/08 43/21.2 |
| 4,485,580 A | | 12/1984 | Ohmura | |
| 4,539,773 A | * | 9/1985 | Eldridge | A01K 87/00 43/25 |
| 4,756,114 A | | 7/1988 | Ohmura | |
| 4,802,299 A | | 2/1989 | Ohmura | |
| 6,065,240 A | * | 5/2000 | Paddock | A01K 87/08 43/21.2 |
| 6,105,301 A | | 8/2000 | Ohmura | |
| 6,295,755 B1 | * | 10/2001 | Macaluso | A01K 87/08 43/21.2 |
| 6,357,639 B1 | | 3/2002 | Williams | |
| 6,493,982 B1 | * | 12/2002 | Macaluso | A01K 87/08 43/21.2 |

(Continued)

*Primary Examiner* — Christopher P Ellis
(74) *Attorney, Agent, or Firm* — Kirk A. Buhler; Buhler & Associates (57) ABSTRACT

Improvements in an arm rest for a fishing pole is disclosed. The arm rest in this disclosure utilizes a replacement reel seat and handle attachment bracket which are installed around the rod blank using epoxy. The replacement reel seat fits onto the outside diameter of the pole and engages into the reel to transfer forces from the reel to the arm rest. A forearm cup is used to distribute loads across a wider area of the arm. The further distance from the reel, the forces are reduced by virtue of distance from the pivot point. Some adjustment allows for accommodating variation in user preference and arm geometry to minimize fatigue. The handle attachment bracket can be combined with a fore grip so the user can install any style of reel seat and in front of the reel body prior to installing the forearm cup or handle.

20 Claims, 8 Drawing Sheets

(56) References Cited

U.S. PATENT DOCUMENTS

| | | | |
|---|---|---|---|
| 6,748,691 B2* | 6/2004 | Doucette | A01K 87/08 43/21.2 |
| 7,533,485 B2* | 5/2009 | Nyland | A01K 87/08 43/21.2 |
| 7,707,766 B2* | 5/2010 | Millen | A01K 87/08 16/110.1 |
| 8,307,579 B2 | 11/2012 | Nyland | |
| 9,220,248 B2 | 12/2015 | McCord | |
| 10,179,401 B2* | 1/2019 | Nyland | B25G 1/06 |
| 2014/0250630 A1 | 9/2014 | Nugent | |

* cited by examiner

ARM REST FOR A FISHING POLE

CROSS REFERENCE TO RELATED APPLICATIONS

This application claims the benefit of Provisional Application Ser. No. 62/647,348 filed Mar. 23, 2018 and the benefit of Provisional Application Ser. No. 62/703,294 filed Jul. 31, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an arm or wrist rest for a fishing pole. More particularly, the present arm rest for a fishing pole supports a person holding the fishing pole and counteracts the forces when a fisherman turns the reel handle to wind fishing line onto the line spool. While one hand turns the reel handle, the other hand usually grasps the cylindrical tube and tries to resist the twisting motion of the rod.

Description of Related Art Including Information Disclosed Under 37 CFR 1.97 and 1.98

Fishing is a hobby or a profession for many people. For many fishermen when a large fish is hooked, the fisherman needs to exhort a large amount of torsion to the reel handle to retract the fishing line onto the spool. This usually required a rotational action on the reel handle where the rotation lifts, pushes and pulls the pole as the line is being retracted. This rotation places a high strain and fatigue on the wrist of the arm holding the fishing rod. To combat the rotational forces several people, have invented levers or rod extensions to allow the forces to be counteracted by the arm that holds the pole.

Reel and rod rotation or wobble is a problem and is particularly problematic for those who are aging and no longer have the wrist strength necessary to enjoy the fishing experience to the degree they once did. Issues of arthritis and tendonitis, in addition to overall wrist strength, make deep sea fishing problematic and less enjoyable. Female anglers typically do not have the same natural wrist strength as men, which makes their fishing experience more challenging. Teaching young anglers to deep sea fish is also problematic as their wrist strength is still to be developed. Having a successful experience at a young age can help to promote outdoor activities they can enjoy throughout life. A number of patents and or publications have been made to address these issues. Exemplary examples of patents and or publication that try to address this/these problem(s) are identified and discussed below.

U.S. Pat. No. 5,941,012 issued on Aug. 24, 1999 to Michael J. Dominguez is titled Power Rod Extension. This patent discloses a rest for a fishing pole which will not only add additional support for a fishing pole but will also transfer some of the shock to a user's arm, thereby protecting the user's wrist. It comprises a rest which is attached to the fishing pole and has an arm which fits under the user's forearm to provide support. In addition, the device includes a strike strength meter which will indicate the weight of a fish on the line. While this extension arm protects the wrist, the configuration does not provide ideal protection or counter forces.

U.S. Pat. No. 6,065,240 issued on May 23, 2000 to William L. Paddock and is titled Arm Rest for Pole-Like Objects. This patent discloses an arm rest for use with a fishing pole supports a user's forearm while fishing and broadly comprises a mount adapted to releasably attach to the butt end portion of the fishing pole and a forearm cradle. The forearm cradle is pivotally disposed on the mount and is operative to move between a stowed position wherein the forearm cradle extends along a longitudinal axis of the fishing pole and a deployed position wherein the forearm cradle extends at an angle relative to the longitudinal axis to elevate the user's forearm above the butt end portion. The clamping mechanism in this patent places forces on the pole and can cause damage as it bites into the pole.

U.S. Pat. No. 6,105,301 issued on Aug. 22, 2000 to Ryuichi Ohmura and is titled Reel Seat for a Fishing Rod. This patent discloses a fishing rod reel seat in which a nut type movable hood scrapes a surface of a body at a position opposite to a mounting foot of the reel when the nut type movable hood causes the mounting foot of the reel to be pressed. In this patent, the hood scrapes the body to provide resisting forces. It does not provide an even and consistent force to resist the rotational forces.

What is needed is an arm rest for a fishing pole that allows the pole to be firmly held while the reel handle is being turned and the forces are not transmitted to the wrist of the hand holding the fishing pole. The proposed arm rest for a fishing pole in this application provides the solution.

BRIEF SUMMARY OF THE INVENTION

It is an object of the arm rest for a fishing pole to provide resisting forces that counteract the rotation or reel wobble of the reeling of line on the line spool. These forces can be very high and result in wrist fatigue which minimizes the period of time or the efficiency when a fish is being reeled toward the fisherman. Providing a comfortable arm rest that provides support without discomfort is a main goal of the fishing pole arm rest. Reel wobble occurs because of a weakened or fatigued wrist on the hand which is holding the fishing rod. With a flexible and rotatable shoulder, elbow and wrist joint, anglers struggle to match and align their attempts to reel in the large game fish with that of the gears of the fishing reel which maintain an exact rotation due to their gears.

It is an object of the arm rest for a fishing pole to have a securing mechanism that does not grip into the pole and thereby cause damage to the rod. The arm rest in this disclosure utilizes a replacement reel seat and handle attachment bracket which are installed around the rod blank using epoxy. The replacement reel seat and handle attachment bracket fit onto the outside diameter of the pole and engages into the reel to transfer forces from the reel through the reel seat and handle attachment bracket to the arm rest. This configuration minimizes forces that are transferred to the pole.

It is another object of the arm rest for a fishing pole to be configurable to accommodate left or right-handed poles. This allows for more versatility with different individuals. Accommodating different handed users is accomplished by installing a left side or right side handle. The left side handle can easily be removed and a right side handle installed in its place. Transferring from one side of the handle attachment bracket to the other requires a reverse molded Handle. The same Handle will not work on the other side for different handed user. However, a left handle can be used on the left side of any other pole which has installed a handle attachment bracket, and vice versa.

It is still another object of the arm rest for a fishing pole to cup or support the forearm of the user. This distributes loads across a wider area of the arm. The further distance from the reel, the forces are reduced by virtue of distance from the pivot point. Some adjustment allows for accommodating variation in user preference and arm geometry. A series of bends in the connection from the handle attachment bracket to the arm rest allows the arm rest to be positioned for a neutral orientation from the palm to the arm rest to allow a user to comfortably hold and use the rod and reel with minimal fatigue.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

Figure 1:
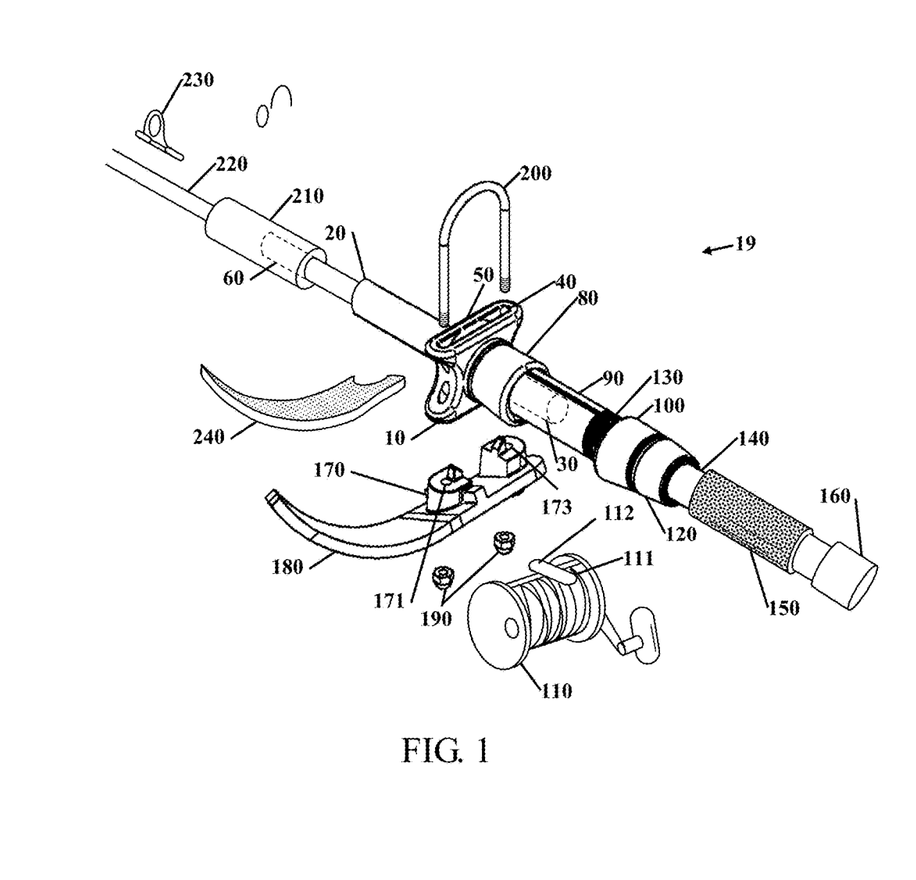
FIG. 1 shows a perspective view of the arm rest for a fishing pole on a fishing pole.

ITEM NUMBERS AND DESCRIPTION 10 handle attachment bracket
11 rectangular structure
12 recess
18 angler
19 fishing pole
20 front tube extension
21 hole
22 tube
23 channel
24 reel seat
30 rear tube extension
31 longer rear tube extension
40 hole for U-bolt legs
50 channel for U-bolt
60 inset in fore grip
61 keyways
62 keys
63 reel seat tube body extension
64 outer ring
65 inner ring/stop
66 fully integrated front hood
67 rear hood keyway
68 front and read hood keyway
80 front reel seat hood
81 nut
82 threaded portion
90 reel seat tube body
100 rear reel seat hood
101 hood seat
102 hood
110 fishing reel
111 rear tabs or foot
112 front tab or foot
113 hood
120 nut
130 threads
140 rod blank
150 rear grip
160 rod butt
170 pitch block
171 hole
172 clearance recess
173 hole
174 arc slot
175 clearance recess slot
177 rotated
178 tab(s)
180 support side handle (left)
181 support side handle (left)
182 area
183 transitions
190 wing nut washer/cap nut
200 U-Bolt
210 foregrip
220 rod blank
230 line guide
240 pad
241 pad
242 pad on reverse tongue
243 pad on outer tongue
244 outer tongue
245 inner tongue
300 upward angle
301 fisherman angle
310 angled
311 fisherman angle
320 angle
330 upward pitch FIG. 1 shows a perspective view of the arm rest for a fishing pole on a fishing pole. The arm rest for a fishing pole is constructed using two essential components, the handle attachment bracket 10 and the support side-handle 180 (left). There are several different embodiments and configurations that are contemplated for the handle attachment bracket 10. Two versions of the support side handle, as well as a left and right version for each support side handle. In the interest of simplicity all of the different combinations and variable options are not separately shown. The different versions of the basic contemplated embodiments of the handle attachment bracket 10 is shown separately along with the different versions of the two embodiments of the support side handles and the left or right support side handles. One skilled in the art will understand the interaction and interchangeability of the components. In FIG. 1, a contemplated embodiment of the components on a fishing pole is shown as an example. The fishing pole has a rod blank 220 with a line guide 230. The rod blank 220 is shown with a fore grip 210. There is an inset in the fore grip 60.

The front fore grip 210 has a molded inset that slides over and is bonded to the front tube of the handle attachment bracket 20. This embodiment of the handle attachment bracket 50 has a front tube extension 20 and a rear tube extension 30. The handle attachment bracket 50 has a channel 40 for a U-bolt 200 that fits into the channel and the threaded ends of the U-bolt pass through the hole(s) 40 for the U-bolt 200. The free ends of the U-bolt 200 pass through the hole(s) 40, around the rod blank 220 and into holes 171, 173 in the pitch block in the support side handle 180. The pitch block 170 angles the support side handle 180. A pad 240 is secured to the top surface of the support side handle 180. Wing nuts, cap nut 190 or similar nut are threaded onto the free ends of the U-bolt 200 to secure the handle attachment bracket 10 and the support side-handle 180 onto the rod blank 220.

The rod blank 220 is also shown with a front reel seat hood 80 and a rear extension tube 30 that is adjacent to a reel seat tube body 90 and a reel seat 100. The nut 120 threads 130 to secure a reel seat. The fishing reel 110 has tabs or feet 111 & 112 that engage into the front 80 and rear 100 reel seat hoods. While the reel is shown mounted under the pole blank, the reel can be mounted or held on either side of the pole blank. The end of the rod blank 140 has a rear grip 150 and a rod butt 160.

Figure 2A:
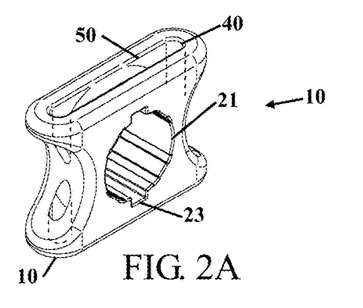
FIG. 2A-2D show different contemplated embodiments of the handle attachment bracket.
Figure 2B:
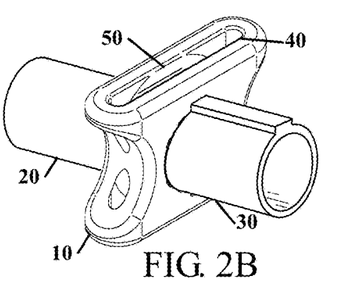
Figure 2C:
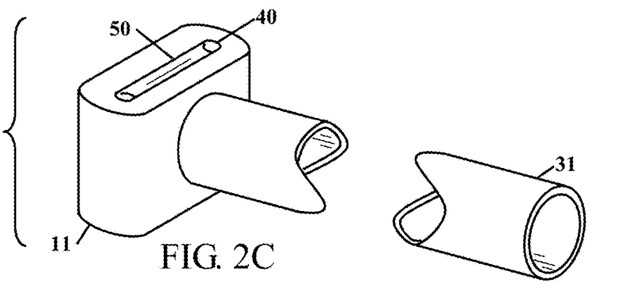

FIG. 2A-2D show different contemplated embodiments of the handle attachment bracket. The handle attachment bracket 10 is a somewhat rectangular structure with a hole 21 that passes through the center which allows it to be slid down the fishing rod blank and be permanently affixed to the fishing rod using an adhesive such as an epoxy. The inside diameter of this hole 21 is lined with channels 23 to assist in bonding to the rod blank. All handle attachment bracket 10 embodiments have this bonding channel 23 design incorporated. FIG. 2C shows rectangular structure 11 has two holes 40 which pass through from top to bottom. The holes 40 allow a U-bolt to pass through the body and a channel 50 allows the center body of the U-bolt to be recessed in the channel 50. A raised face 25 can be included to provide a cosmetic wall for a cushioned grip.

Figure 2D:
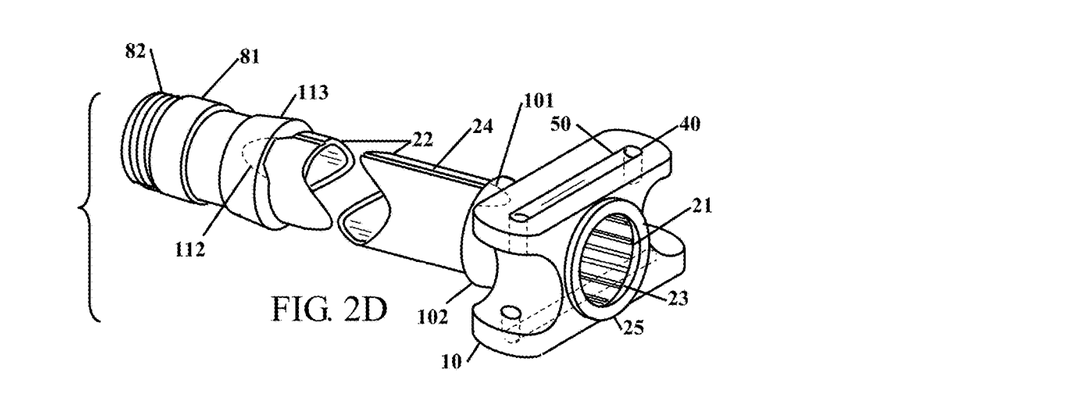

The reel seat is independent of the handle attachment bracket 10/11, unless utilized as shown in FIG. 2D or similar embodiments. The reel seat and the handle attachment bracket 10/11 are bonded or epoxied onto the fishing rod blank when assembled and are not removable. The arm rest handle is the only piece which can be installed and removed from a standard fishing pole. The reel seat and handle attachment bracket can be installed independently or as a one-piece unit. Once the fishing reel is connected the reel seat, it transfers forces from the fishing reel through the reel seat and handle attachment bracket to the arm support handle The top of the U-bolt rests in a channel 50 located on the top and bottom of the handle attachment bracket 10 or 11. Having a channel recess 50 on both sides allows the attachment bracket to be placed in either orientation. The top and bottom of the handle attachment bracket 10 or 11 are identical so the angler may attach the handle in the same location when fishing with the casting or spinning reel in the up or down position.

All of the handle attachment bracket embodiments have the exact same design features. The embodiments shown in FIGS. 2A, 2B and 2D show a concave design that helps to reduce weight of the handle attachment bracket 10 on the fishing rod.

In FIG. 2C the ends of these embodiments have rounded ends and are used when additional structural support is needed. Handle attachment bracket embodiments shown in FIGS. 2B, 2C show a bonding tube extension 20, 30 and a longer tube extension 31 on the front and back of the handle attachment bracket. These tube extensions create additional bondable surface areas to help secure the handle attachment bracket to the rod blank when installing on smaller diameter fishing rods. The tube extensions have bonding channels which run the entire length of the handle attachment bracket. The rear tube extension fits inside the reel seat and is bonded to the reel seat. A front fore grip with molded inset, slides over and is bonded to the front tube extension 20.

The embodiment in FIG. 2D shows a handle attachment bracket 10 that may be individually combined with a reel seat 24 to create a one-piece unit. Hoods 102 and 113 have hood seats 101 and 112 respectively and turning nut 81 on the threaded portion 82 of the tube 22 that are installed separately to secure a reel on the reel seat/handle attachment bracket combination. A fore grip can be combined with a handle attachment bracket, either as a one-piece unit or as an assembly as shown in FIG. 2C. These embodiments allow fishing rods to be assembled using any reel seat desired. The handle attachment bracket and fore grip one-piece unit is installed on the fishing rod after and in front of the reel seat and is independent of the reel seat as shown in FIG. 2C. This one-piece unit is installed on the fishing rod blank in the same manner as a standard reel seat. By combining the two there is less time involved in the assembly process of the fishing rod decreasing labor and production costs. The one-piece unit is made of a plastic type material, or other suitable materials. The embodiment in FIG. 2D shows a reel seat 24 to accommodate some versions of reels.

Figure 3A:
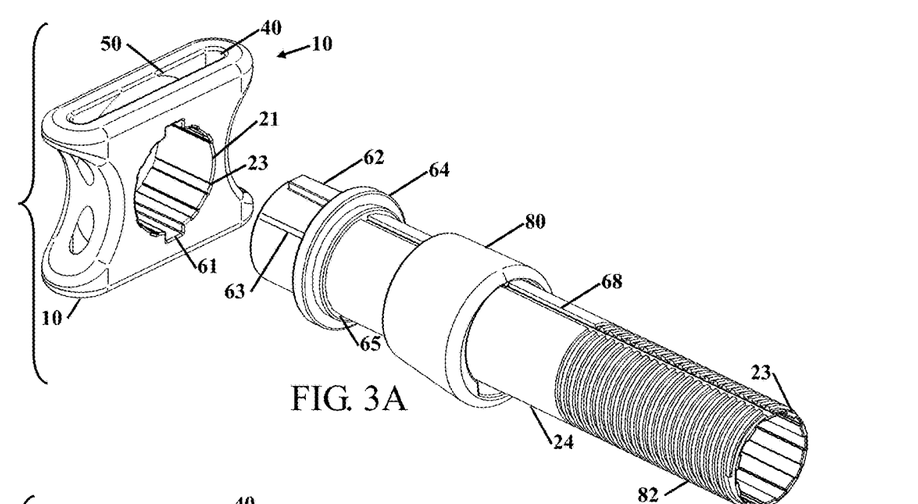
FIGS. 3A and 3B shows two different embodiments of a keyed handle attachment bracket.
Figure 3B:
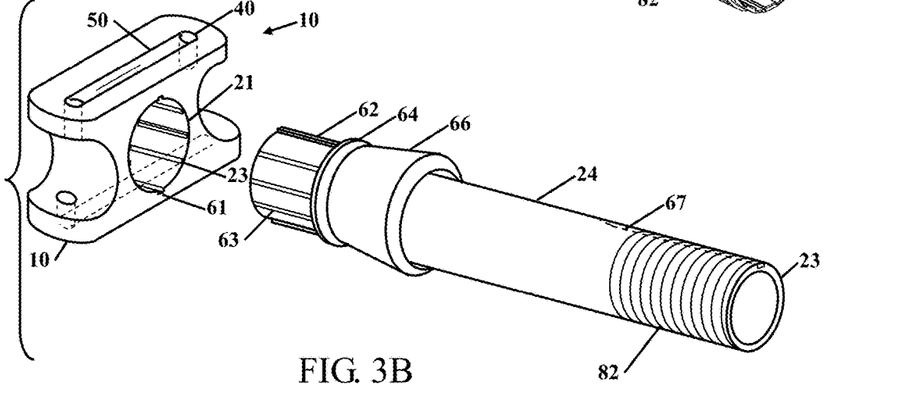

FIGS. 3A and 3B shows two different embodiments of a keyed handle attachment bracket 10. In these figures the bracket 10 has two keyways 61 that are on opposite sides of the hole 21. Placement of at 180 degrees opposed sides allows for placement of the reel seat 24 at upward or downward facing orientations. The front face of the reel seat tube body extension 63 has complementary keys 62 which fit into the keyways 61 of the handle attachment bracket. In one embodiment there is an outer ring 64 that to cover or hide the keyways 61 on the back face of the handle attachment bracket. The keyways 61 terminate about ⅛ inch from the front face of the handle attachment bracket, as do the keys 62 on the reel seat tube body extension 63 from its front face. On the backside of the front ring there is a smaller ring 65 which acts as a "stop ring" 65 for the front hood when it's installed. The reel seat 24 in FIG. 3A is shown with a full-length front and rear hood keyway 68, but could be fabricated without the keyway 68 or a shortened keyway 67 as shown in FIG. 3B.

In other embodiments, the "stop ring" 65 has been replaced with a fully integrated front hood 66 in the one-piece reel seat tube body 24. This one-piece integrated front hood is shown as a one-piece reel seat tube body with the integrated front hood 66 as shown in FIG. 3B. A rear hood keyway 67 may be included in the real seat 24 of the channel tube 23. The real seat 24 has a threaded portion 82 to secure the fishing reel "feet" inside of the front and rear hoods via turning nut 120 as shown in the figures.

FIG. 4A-4D shows two different embodiments of the side support handle or support. These embodiments can be interchanged, configured as a left or right-handed version and can be used with the reel 110 installed above or below the rod blank 140/220. In addition to these variations, the hole 173 can be configured as an arc slot 174 thereby creating a wrist support or handle which can be rotated 177 for precise positioning for the comfort of the user. The flat area 170 can be recessed between the hole and slot 174.

Figure 4A:
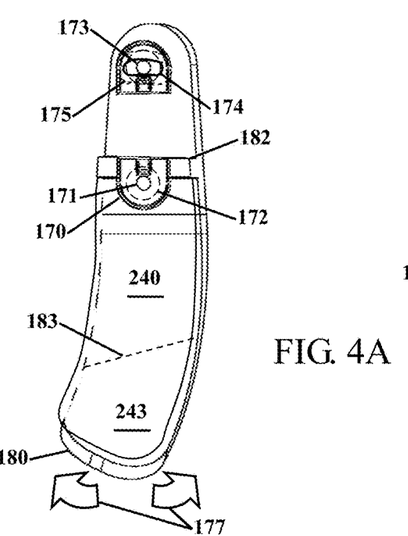
FIG. 4A-4D shows two different embodiments of the side support handle or support.
Figure 4B:
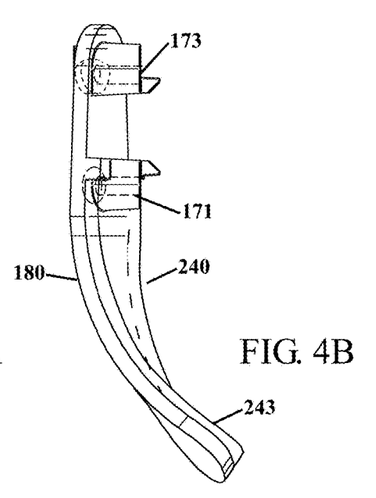
Figure 4C:
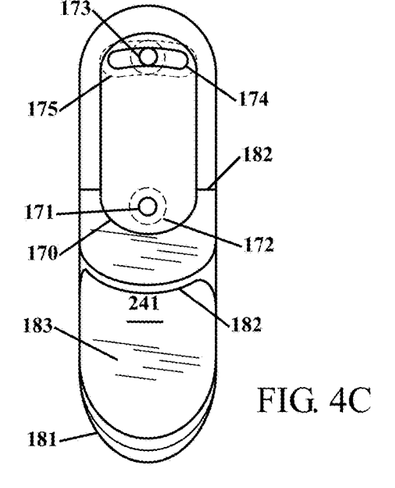
Figure 4D:
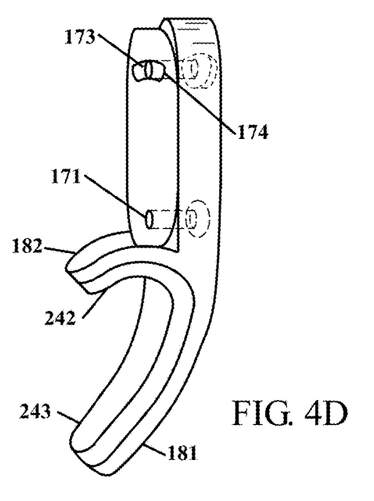
Figure 8A:
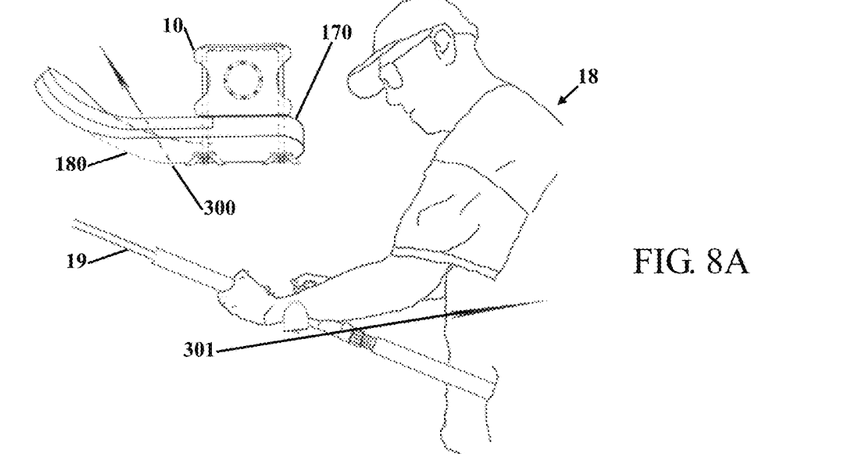
FIG. 8A-8C show the different directions of loads on the pole and fisherman as the line is being retracted.
Figure 8B:
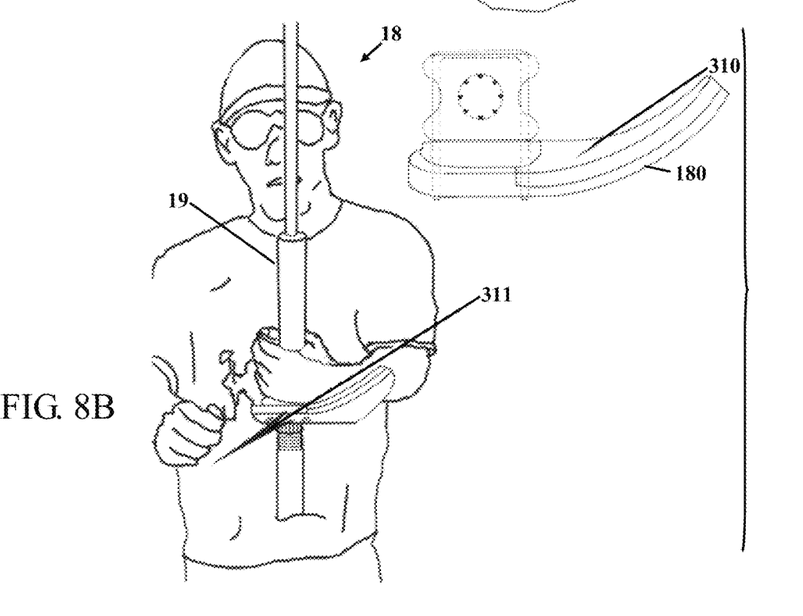
Figure 8C:
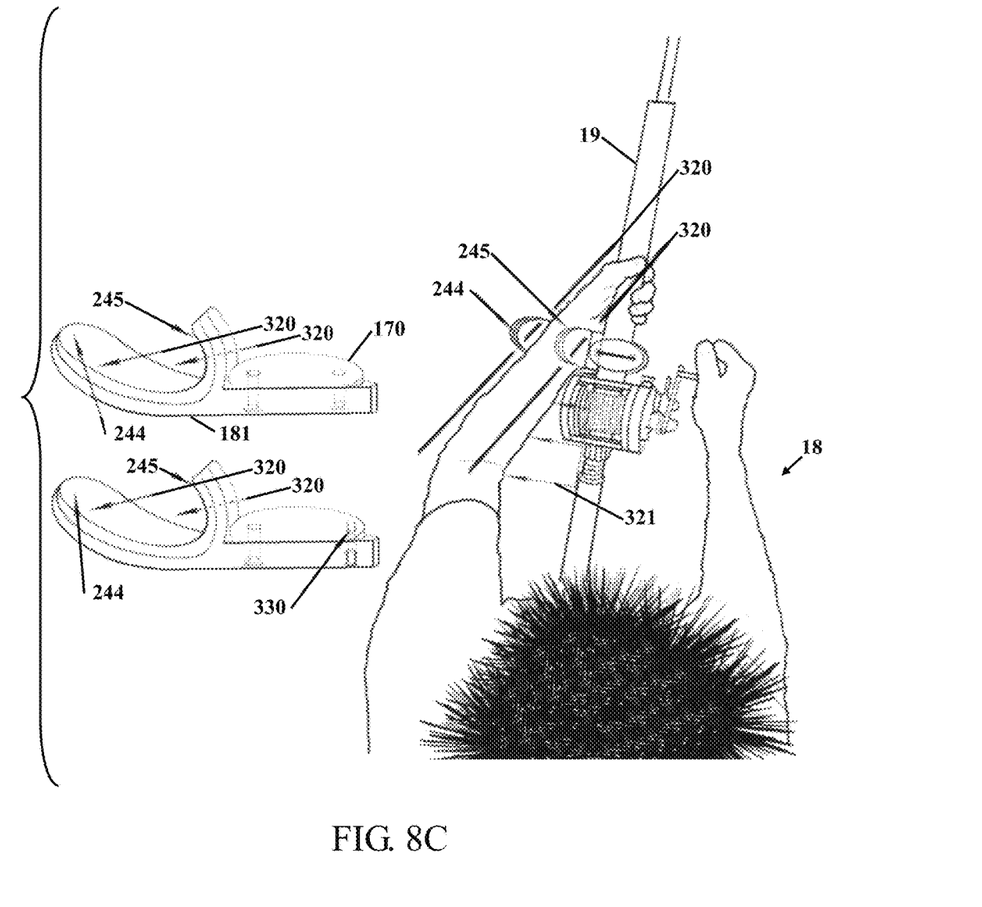

FIGS. 4A and 4C show top views, while FIGS. 4B and 4D show side views of the two different embodiments. While only a left or right version is shown or described, the mirror or reverse image of these embodiments will be obvious to one skilled in the art. FIGS. 4A and 4B show a single support handle 180 and FIGS. 4C and 4D show the support side handle 181 with an inner tongue 182 that prevents the fishing rod from rotating toward the angler's arm that is holding the fishing rod. The inside face of the lower forearm rests against the inside tongue preventing the fishing rod and reel from rotating in that direction. The inner tongue 182 is laterally angled to match that of the outer tongue 181. This angle approximates the direction of the inside face of the lower forearm as it transitions away at an angle 320 from the fishing rod to the angler's elbow while gripping the fishing pole as shown in FIG. 8C.

The support side handle, when connected to the handle attachment bracket, extends out at 90 degrees from the fishing rod. These figures show a pitch block 170 which when installed to the handle attachment bracket 10 or 11 creates an upward angle or pitch of the handle from front to back motion. This upward pitch approximates the angle of the lower forearm after gripping the underside of the fishing rod as the lower forearm by the angler's wrist transitions up to the angler's elbow. This allows the angler to have a portion of the bottom of the lower forearm bear fully on the handle below it and against the outer "tongue" or support side 180/181. As the handle transitions 183 under the angler's lower forearm it then sweeps up behind the backside or outside of the lower forearm. When the angler rotates his hand to grip the underside of the fishing rod, the back side of the hand and lower forearm will rotate into the final gripping position.

The pitch block 170 creates an upward pitch of the side support handle 180/181 front to back, when attached to the handle attachment bracket using a U-bolt and two one-piece wing nut washers. The angle on the bottom of the handle when attached is not at 90 degrees to the U-bolt 200 legs which pass through the bottom of the handle vertically, where the one-piece wing nut washers are integrated or attached. This angle approximates the angle of the bottom of the angler's lower forearm as it transitions from the hand holding the fishing rod to the elbow.

The pitch block 170 has a hole 171, or a hole and an arc slot 174, for securing the U-bolt and providing an anchor location. This requires the area where the washer will bear on the bottom clearance recess (s) 172/175 of the handle be countersunk vertically so the washer will have full bearing on the bottom of the handle and be at 90 degrees to the U-bolt legs when secured. At an area 182 under the pitch block 170, the support handle transitions from a flat configuration to a curved configuration. While recesses 172/175 are shown, it should be understood that these areas can stand above the surrounding area.

The side supports also include incorporate a ¼-inch self-adhesive pad 240 and 241 located where the angler's lower forearm will bear on and against the handle and handle "tongue" respectively. The pad 240/241 provides a cushion for the bottom and outside 243 of the lower forearm as the handle tries to rotate upward when the rod and reel attempt to rotate downward on the opposite side. This rotation occurs during the 12 o'clock to 6 o'clock position of the reel handle during the reeling in of the game fish. In FIG. 4D the pad is shown on the reverse side 242 of the tongue 182.

Figures 5A, 5B:
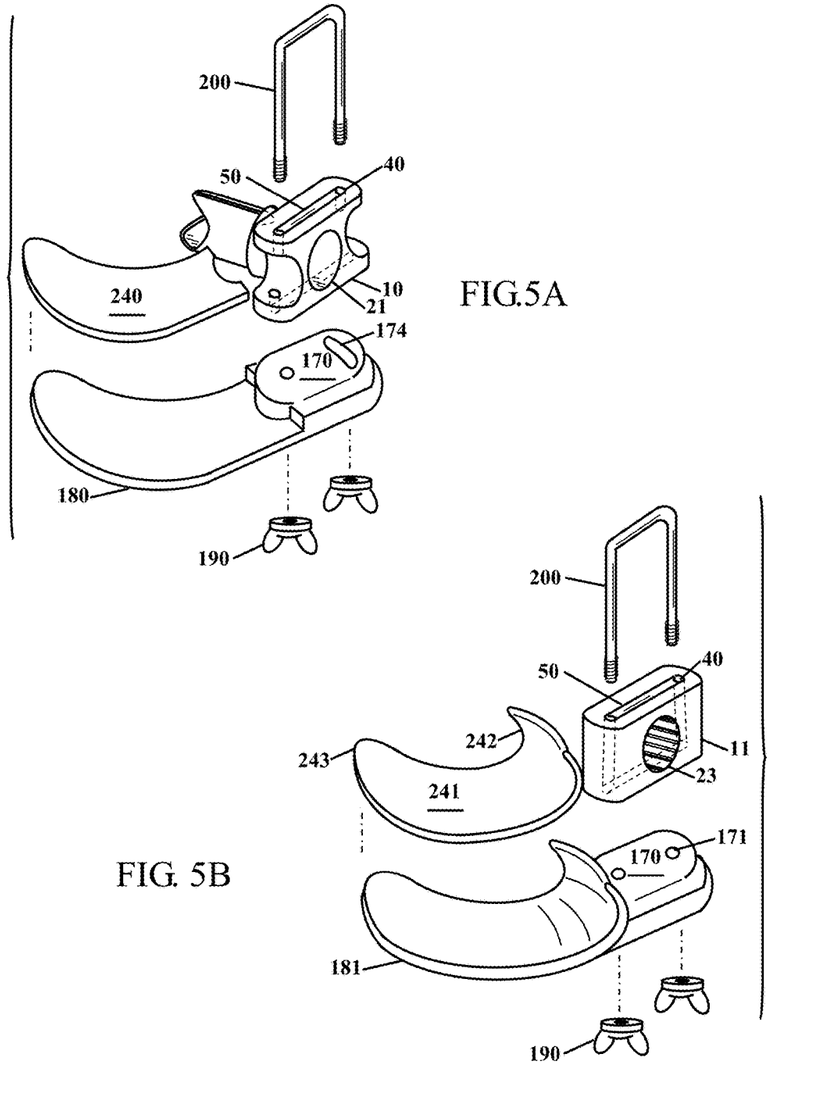
FIGS. 5A and 5B show the joined components of the handle attachment and the side support handle.

FIGS. 5A and 5B show the joined components of the handle attachment bracket and the side support handle. The U-bolt 200 that fits into the channel 50 and the threaded ends of the U-bolt pass through the hole(s) 40 for the U-bolt 200. The free ends of the U-bolt 200 pass through the hole(s) 40, through the pitch block 170 and the support side handles 180/181 where the free ends of the U-bolt 200 is secured with wing nut washers 190. Two one-piece wing nut 190 washers are then attached to the threaded U-bolt 200 legs located on the bottom of the support handle 180/181 and tightened. The side support handle attaches to the handle attachment bracket 10/11 at a 90-degree angle to the fishing rod blank as shown in FIGS. 1 and 5A. When attached, the arm rest goes under and wraps around the back side of the angler's lower forearm that is gripping the fishing rod as shown in FIGS. 8A and 8B. The fishing rod blank fits through the smooth hole 21, a channeled hole 23 or any of the previously described handle attachment brackets shown and described in FIGS. 2A-2D. The ¼-inch depth self-adhesive pads 240/241 are shown ready to install on the support side handles 180/181 respectively where the lower forearm will bear for comfort.

Figure 6:
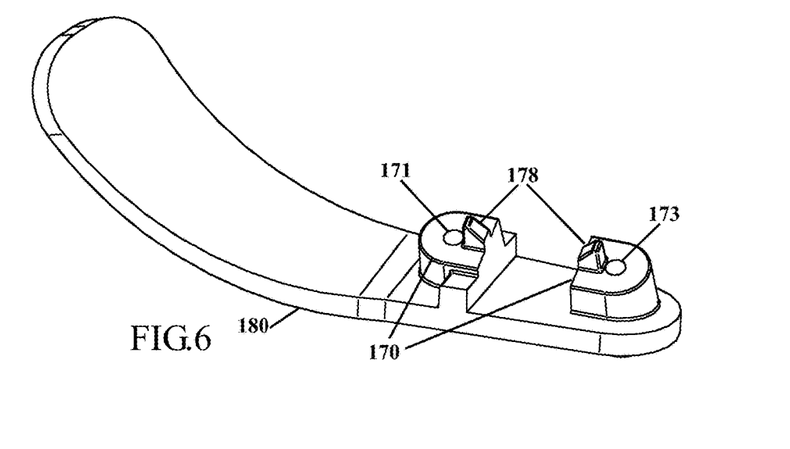
FIG. 6 is a perspective view of the side support handle.
Figure 7:
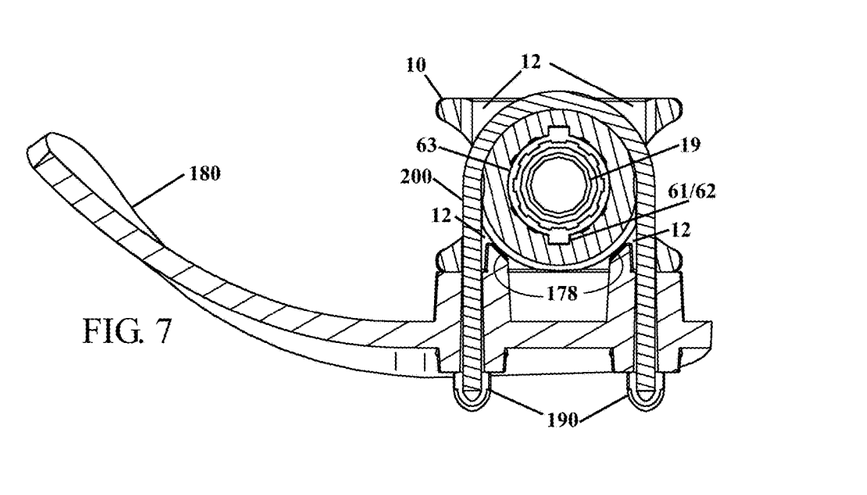
FIG. 7 is a cross-sectional view of the arm rest.

FIG. 6 is a perspective view of the side support handle and FIG. 7 is a cross-sectional view of the arm rest. In FIG. 6 the side support handle 180 shows the tabs 178 extending above the pitch block 170. While the tab 178 is shown split, it should be understood that the tab 178 can be connected between the two tabs 178. There could also be more than two tabs 178. In FIG. 7 the tabs 178 are shown inserted into the recesses 12 in the handle attachment bracket 10. Engagement of the tabs 178 in the recess 12 prevent rotation of the side support handle 180 in the handle attachment bracket 10. The handle attachment bracket 10 is symmetric to allow the handle attachment bracket 10 to be placed in multiple orientations.

The U-bolt 200 is shown passing through the handle attachment bracket 10 and the holes 171 and 173 in the side support handle 180 where the U bolt 200 is secured with cap nuts 190 or wing nuts. The reel seat tube body extension 63 is shown in the handle attachment bracket 10 where the key 61 in the reel seat tube body extension 63 is engaged in the keyway 62 of the handle attachment bracket 10. This prevents rotation of the reel seat tube body extension 63 in the handle attachment bracket 10. It is also contemplated that the reel seat tube body extension 63 can be bonded to the handle attachment bracket 10 to make the two parts an integrated sub assembly. It should be noted that the side support handle does not bolt directly onto the fishing pole 19 where the clamping force can deform, compromise or crush the fishing pole 19.

FIG. 8A-8C show the different directions of loads on the pole and fisherman as the line is being retracted. In FIG. 8A the support side handle 180, when connected to the handle attachment bracket 10, extends out at 90 degrees from the fishing rod. The pitch block 170 creates an upward angle 300 or pitch of the handle from front to back motion. This upward pitch 300 approximates the angle 301 of the lower forearm after gripping the underside of the fishing pole 19 as the lower forearm by the angler's wrist transitions up to the angler's elbow. This allows the angler 18 to have a portion of the bottom of the lower forearm bear fully on the handle below it and against the outer "tongue". As the handle transitions under the angler's 18 lower forearm it then sweeps up behind the backside or outside of the lower forearm.

In FIG. 8B the angler 18 rotates his hand to grip the underside of the fishing rod 19, the back side of the hand and lower forearm will rotate into the final gripping position. The portion of the side support handle 180 that wraps around the backside of the lower forearm is angled 310 to match that of the backside angle 311 of the lower forearm in the final gripping position. This allows the angler 18 to have full bearing of the backside of the lower forearm on the portion of the side support handle 180 sweeping up behind it. This portion or section of the handle is termed the handle's outer "tongue" in drawing and throughout the different side support handle 180 designs embodiments.

In FIG. 8C the inside and outside angle 320 of the lower forearm are shown as it transitions from the hand holding the fishing rod to the angler's 18 elbow. The outside handle tongue 244 is angled or twisted to match that of the outside lower forearm. The tongue 244 is turned or "set back" horizontally front to back. This matches the angle 320 of back side of the lower forearm as it transitions away from the fishing rod horizontally to the elbow. This horizontal angle 320 front to back, allows the backside of the anglers 18 forearm to bear fully on the handles outer tongue 244 as it transitions away from the fishing rod toward the angler's elbow. Another design element of the handle is the two vertically countersunk holes on the bottom. The pitch block 170 creates an upward pitch 330 of the handle front to back.

A self-adhesive pad is located where the angler's 18 lower forearm will bear on and against the side support handle. The pad provides a cushion for the bottom and outside of the lower forearm as the handle tries to rotate upward when the rod and reel attempt to rotate downward on the opposite side. This rotation occurs during the 12 o'clock to 6 o'clock position of the reel handle during the reeling in of the game fish.

The side support handle 181 in FIG. 8C has an inside or inner tongue 245. The inside tongue 245 prevents the fishing rod from rotating toward the angler's arm that is holding the fishing rod or pole 19. The inside face of the lower forearm rests against the inside tongue 245 to prevent the fishing rod 19 and reel from rotating in that direction. This rotation occurs during the 6 o'clock to 12 o'clock position of the fishing reel handle when the angler is reeling in the game fish. During the 6 o'clock to 12 o'clock position of the reel handle when reeling in large game fish, anglers tend to "pull" upwards towards their body due to the nature of the human anatomy. This upward "pull" 321 causes the fishing rod 19 and reel to rotate towards the arm which is holding the fishing rod. The inside tongue 245 prevents rotation in that direction. The inner tongue 245 is laterally angled to approximates the direction and contour of the inside face of the lower forearm as it transitions away from the fishing rod to the angler's elbow.

Thus, specific embodiments of an arm rest for a fishing pole have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An arm rest for a fishing pole comprising:
   a handle attachment bracket;
   said handle attachment bracket having a through rod hole that is configured to accept a fishing pole;
   said handle attachment bracket having at least two parallel openings therethrough that are perpendicular to said through rod hole;
   a side support handle;
   said support handle having complementary holes that align with said at least two parallel holes, and
   a U-bolt that passes through said at least two parallel holes to secure said handle attachment bracket to said side support handle.

2. The arm rest for a fishing pole according to claim 1, wherein said side support handle has a pitch block.

3. The arm rest for a fishing pole according to claim 1, wherein one of said at least two parallel openings is a hole and at least one arc slot that is arced from said hole.

4. The arm rest for a fishing pole according to claim 1, wherein said handle attachment bracket further includes a recess for said U-bolt.

5. The arm rest for a fishing pole according to claim 1, wherein said side support handle is configured to secure onto said handle attachment bracket in at least two orientations.

6. The arm rest for a fishing pole according to claim 1, wherein said side support handle secures to said fishing pole above a fishing reel.

7. The arm rest for a fishing pole according to claim 1, wherein said side support handle secures to said fishing pole below a fishing reel.

8. The arm rest for a fishing pole according to claim 1, wherein said side support handle secures to said fishing pole in front of a fishing reel.

9. The arm rest for a fishing pole according to claim 1, wherein said handle attachment bracket has at least one recess.

10. The arm rest for a fishing pole according to claim 9, wherein said side support handle has at least one tab that is configured to engage into said at least one recess in said handle attachment bracket.

11. The arm rest for a fishing pole according to claim 10, wherein said at least one tab keys into said at one recess.

12. The arm rest for a fishing pole according to claim 1, wherein said side support handle twists from said handle attachment bracket.

13. The arm rest for a fishing pole according to claim 1, wherein said side support handle is angled from said handle attachment bracket.

14. The arm rest for a fishing pole according to claim 1, further includes a fishing reel seat.

15. The arm rest for a fishing pole according to claim 14, wherein said fishing reel seat includes a key that engages into a keyway in said handle attachment bracket.

16. The arm rest for a fishing pole according to claim 5, wherein said at least two orientation allows for use for both a left and right handed user.

17. The arm rest for a fishing pole according to claim 16, wherein said side support applies pressure downward on a forearm.

18. The arm rest for a fishing pole according to claim 16, wherein said side support applies pressure upward on a forearm.

19. The arm rest for a fishing pole according to claim 1, wherein said side support provides a torsional forces on said fishing pole.

20. The arm rest for a fishing pole according to claim 1, further includes a foregrip, said handle attachment bracket and said foregrip are secured after and in front of a fishing reel.

\* \* \* \* \*